United States Patent
Mishima et al.

(10) Patent No.: US 8,682,060 B2
(45) Date of Patent: Mar. 25, 2014

(54) IMAGE PROCESSING METHOD, APPARATUS, AND COMPUTER PROGRAM PRODUCT

(75) Inventors: Nao Mishima, Tokyo (JP); Takeshi Mita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 253 days.

(21) Appl. No.: 13/049,620

(22) Filed: Mar. 16, 2011

(65) Prior Publication Data

US 2012/0128256 A1    May 24, 2012

(30) Foreign Application Priority Data

Nov. 19, 2010  (JP) ................. 2010-259440

(51) Int. Cl.
*G06K 9/00* (2006.01)
*G06K 9/62* (2006.01)
*G01C 3/14* (2006.01)
*G02B 27/22* (2006.01)

(52) U.S. Cl.
USPC .............. 382/154; 382/209; 356/12; 359/462

(58) Field of Classification Search
None
See application file for complete search history.

(56) References Cited

U.S. PATENT DOCUMENTS

| | | | |
|---|---|---|---|
| 5,768,404 A * | 6/1998 | Morimura et al. | 382/107 |
| 7,502,528 B2 | 3/2009 | Mishima et al. | |
| 7,561,621 B2 | 7/2009 | Itoh et al. | |
| 2009/0074071 A1 * | 3/2009 | Nagumo et al. | 375/240.16 |
| 2009/0185622 A1 | 7/2009 | Itoh et al. | |

FOREIGN PATENT DOCUMENTS

| | | |
|---|---|---|
| JP | 61-26191 | 2/1986 |
| JP | 2007-275346 | 10/2007 |
| JP | 2008-234465 | 10/2008 |
| JP | 2009-266169 | 11/2009 |

OTHER PUBLICATIONS

Chambon et al., Color Correlation-Based Matching, 2005, International Journal of Robotics and Automation, IJRA, 20(2).*
Notice of Rejection issued by the Japanese Patent Office on Oct. 2, 2012, for Japanese Patent Application No. 2010-259440, and English-language translation thereof.
Notification of the First Office Action issued by the State Intellectual Property Office of the People's Republic of China on Nov. 7, 2013, for Chinese Patent Application No. 201110266340.5, and English-language translation thereof.

* cited by examiner

*Primary Examiner* — Amir Alavi
*Assistant Examiner* — Kenny Cese
(74) *Attorney, Agent, or Firm* — Finnegan, Henderson, Farabow, Garrett & Dunner, L.L.P.

(57) ABSTRACT

According to one embodiment, an image processing method includes calculating an activity value for a first block, the activity value indicating a higher degree of activity as pixel values vary in a greater degree in the first block, and calculating a first evaluation value that indicates higher evaluation as a difference between a pixel value of the first block and a pixel value of a second block is smaller. The method further includes calculating a second evaluation value that indicates higher evaluation as correlation between a relative spatial relationship of the pixel value of the first block and that of the pixel value of the second block is higher, and calculating a third evaluation value by weighting the first evaluation value and the second evaluation value to search for the second block that corresponds to the first block, a weight of the first evaluation value is larger as the activity value is larger.

12 Claims, 15 Drawing Sheets

US 8,682,060 B2

IMAGE PROCESSING METHOD, APPARATUS, AND COMPUTER PROGRAM PRODUCT

CROSS-REFERENCE TO RELATED APPLICATIONS

This application is based upon and claims the benefit of priority from Japanese Patent Application No. 2010-259440, filed on Nov. 19, 2010; the entire contents of which are incorporated herein by reference.

FIELD

Embodiments described herein relate generally to an image processing method, apparatus, and a computer program product.

BACKGROUND

There have been technologies for searching for corresponding points from among multiple images. One of the methods of searching for corresponding points is block matching, with which matching of blocks of a certain size included in the images is performed. As a block matching method, as described, for example, in JP-A 2008-234465 (Kokai), a maximum absolute difference (MAD) may be used. According to this method, block matching that is robust in lightness variation can be realized. The MAD is weak in noise, but by linearly combining the sum of absolute differences (SAD), noise robustness can also be ensured.

With the conventional technologies, however, matching can be successfully conducted if the blocks include characteristic image patterns, but it may fail if the blocks do not have anything particularly characteristic and their lightness is flat. For this reason, a technology that can realize block matching with high accuracy has been desired.

DETAILED DESCRIPTION

Figure 1:
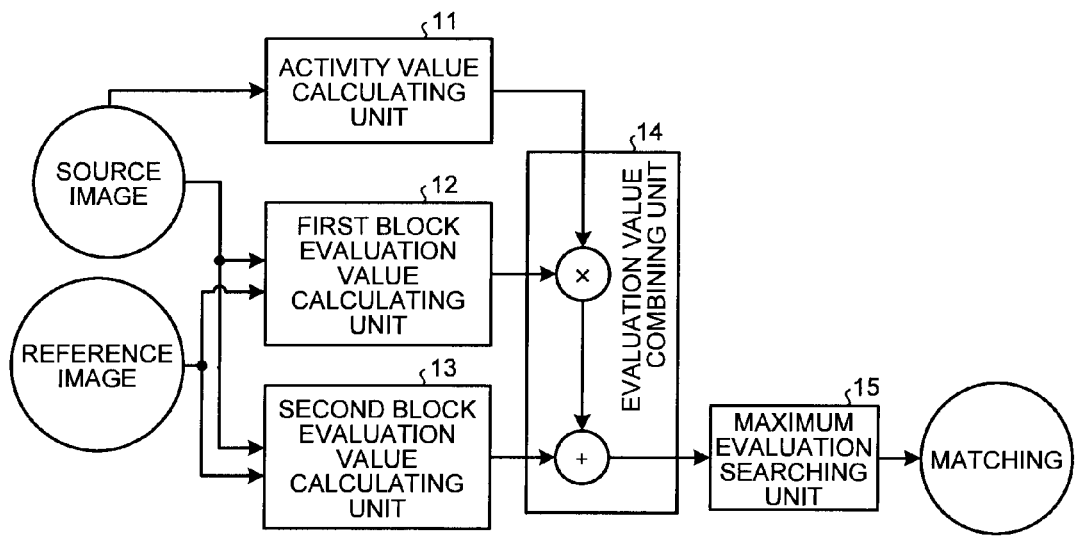
FIG. 1 is a diagram showing an example of a functional structure of an image processing device.

In general, according to one embodiment, an image processing method includes calculating an activity value for a first block, the activity value indicating a higher degree of activity as pixel values vary in a greater degree in the first block, and calculating a first evaluation value that indicates higher evaluation as a difference between a pixel value of the first block and a pixel value of a second block is smaller. The method further includes calculating a second evaluation value that indicates higher evaluation as correlation between a relative spatial relationship of the pixel value of the first block and that of the pixel value of the second block is higher, and calculating a third evaluation value by weighting the first evaluation value and the second evaluation value to search for the second block that corresponds to the first block, a weight of the first evaluation value is larger as the activity value is larger.

An image processing method, an image processing device, and an image processing program according to embodiments are explained in detail below with reference to the attached drawings.

An image processing device according to an embodiment conducts block matching between a source image that serves as a standard image (referred to as a "source image") and a reference image, and associates a block that is an image region including all or part of pixels of the source image (referred to as a "target block") with a reference block highly correlated with the target block from among blocks that are image regions including part of pixels of the reference image (referred to as "reference blocks"). Examples of such association include association for a stereo image taken for stereoscopic viewing in which an image taken by a left-eye camera is associated with an image taken by a right-eye camera, frame association in which a frame of an image corresponding to time t in a video image is associated with a frame of an image corresponding to time t−1, and block association in which, when looking for the same object as the one included in any image of a video image, blocks that correspond to the object are associated with one another. As an evaluation value for such associating operations, a mean absolute difference (MAD) is often used. However, for a stereo image, for example, pixel values that are values of pixels that form each of the left and right images may differ from each other due to the characteristic differences or the like between the left-eye and right-eye cameras. The MAD is an evaluation value based on the assumption that means of the pixel values of highly correlated and associated blocks are equal. If the MAD is adopted as an evaluation value although there is a difference between the pixel values (referred to as "pixel value discrepancy"), association may not be accurately conducted. The pixel value discrepancy is a difference in brightness (referred to as "brightness discrepancy"). On the other hand, increment sign correlation (ISC) has been known as an evaluation value that is robust against pixel value discrepancy. The ISC is an evaluation value based on the relative spatial relationship between adjacent pixels in a block, and thus it is not assumed that the means of pixel values are equal. For this reason, it is robust against the pixel value discrepancy. However, because the means of pixel values are not used, the accuracy of alignment is not as high as the alignment using the MAD. According to the present embodiment, both the MAD and the ISC are used in combination in block matching between the source image and the reference image so that the block matching can be realized with high accuracy. The structure that realizes this matching is explained in detail below.

First, the hardware structure of the image processing device according to the present embodiment is explained. The image processing device according to the present embodiment includes a controlling unit such as a central processing unit (CPU) that controls the entire device, a main storage unit such as a read only memory (ROM) and a random access memory (RAM) that stores various types of data and programs, an auxiliary storage unit such as a hard disk drive (HDD) and a compact disk (CD) drive device that stores various types of data and programs, and a bus that connects these units, and has a hardware structure using an ordinary computer. In addition, a display unit that displays information, an operation input unit such as a keyboard and a mouse that receives instruction inputs from a user, and a communication interface that controls communications with external devices are connected to the image processing device with or without wires. The above-mentioned source image and reference image are stored as image data that indicates a pixel value for each pixel in the auxiliary storage unit such as an HDD. The image processing device may be provided with a receiving unit that receives airwaves, and image data carried on the airwaves may be stored in the main storage unit or the auxiliary storage unit as the image data of the source image or the reference image.

Next, the functional structure of the image processing device having such a hardware structure is explained with reference to FIG. 1. The image processing device includes an activity value calculating unit 11, a first block evaluation value calculating unit 12, a second block evaluation value calculating unit 13, an evaluation value combining unit 14, and a maximum evaluation searching unit 15. These units are realized when the CPU of the image processing device executes various programs stored in the main storage unit and the auxiliary storage unit.

Figure 2:
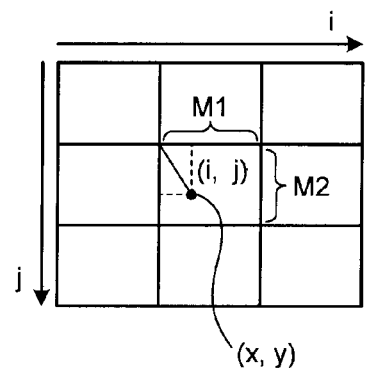
FIG. 2 is a diagram showing an example of reference blocks in a reference image.

The activity value calculating unit 11 calculates an activity value that indicates a degree of activity, which becomes larger as the variation (amplitude) of pixel values of pixels included in the target block increases. The dimensions of the target block in the horizontal direction and the vertical direction are represented as M1 and M2, respectively. The reference blocks are prepared from the reference image divided into multiple rectangles, as illustrated in FIG. 2. The indices of the reference block in the horizontal direction and the vertical direction are represented as i and j, respectively. Furthermore, the relative position of a pixel in each of the target block and the reference block is represented as (x, y). Still further, the pixel value of the pixel at position (X, Y) of the target block is represented as $I_L(X, Y)$, and the pixel value of the pixel at position (X, Y) of the reference block is represented as $I_R(X, Y)$. As an activity value, for example, the standard deviation of the pixel values in the target block is adopted. In this situation, the activity value calculating unit 11 calculates an activity value ACT in accordance with Expression (1) indicated below.

$$ACT(i, j) = \sqrt{\frac{1}{M_1 M_2} \sum_{0 \leq x \leq M_1, 0 \leq y \leq M_2} (\bar{I}(i, j) - I_L(M_1 i + x, M_2 j + y))^2} \quad (1)$$

$$\bar{I}(i, j) = \frac{1}{M_1 M_2} \sum_{0 \leq x \leq M_1, 0 \leq y \leq M_2} I_L(M_1 i + x, M_2 j + y)$$

In addition, as an activity value, the distribution of the pixel values in the target block may be adopted. As another example of an activity value, the mean of the gradients of the pixel values in the target block may be adopted. If the mean of the gradients of the pixel values is used, the activity value calculating unit 11 calculates the activity value ACT in accordance with Expression (2) indicated below.

$$ACT(i, j) = \frac{1}{M_1 M_2} \sum_{0 \leq x \leq M_1, 0 \leq y \leq M_2} (|I_L(M_1 i + 1, M_2 j) - I_L(M_1 i, M_2 j)| + |I_L(M_1 i, M_2 j + 1) - I_L(M_1 i, M_2 j)|) \quad (2)$$

The first block evaluation value calculating unit 12 calculates the first evaluation value that indicates a higher evaluation as the difference between the pixel value of each pixel in the target block and the pixel value of each pixel in the reference blocks is smaller. It is assumed here that the reference block has the same shape and size as the target block. The first evaluation value is accurate in positional alignment, but is vulnerable to pixel value discrepancy. Examples of such a first evaluation value include the MAD mentioned above. Here, the first block evaluation value calculating unit 12 calculates the MAD as the first evaluation value, in accordance with Expression (3) as shown below, where $u=(u_x, u_y)^T$ (T denotes transposition) represents a search target vector of the maximum evaluation search that is discussed later.

$$MAD(i, j, u_x, u_y) = \frac{1}{M_1 M_2} \sum_{0 \leq x \leq M_1, 0 \leq y \leq M_2} |I_L(M_1 i + x, M_2 j + y) - I_R(M_1 i + x + u_x, M_2 j + y + u_y)| \quad (3)$$

The first evaluation value may be the sum of absolute differences (SAD) in place of the mean thereof. In such a situation, the first block evaluation value calculating unit 12 calculates the SAD as the first evaluation value in accordance with Expression (4).

$$SAD(i, j, u_x, u_y) = \sum_{0 \leq x \leq M_1, 0 \leq y \leq M_2} |I_L(M_1 i + x, M_2 j + y) - I_R(M_1 i + x + u_x, M_2 j + y + u_y)| \quad (4)$$

The first evaluation value may be a mean squared error (MSD). In this situation, the first block evaluation value calculating unit 12 calculates the MSD as the first evaluation value in accordance with Expression (5).

$$MSD(i, j, u_x, u_y) = \frac{1}{M_1 M_2} \sum_{0 \leq x \leq M_1, 0 \leq y \leq M_2} (I_L(M_1 i + x, M_2 j + y) - I_R(M_1 i + x + u_x, M_2 j + y + u_y))^2 \quad (5)$$

Still further, the first evaluation value may be the sum of squared differences (SSD) in place of the mean thereof. In such a case, the first block evaluation value calculating unit 12 calculates the SSD as the first evaluation value in accordance with Expression (6).

$$SSD(i, j, u_x, u_y) = \sum_{0 \leq x \leq M_1, 0 \leq y \leq M_2} \qquad (6)$$

$$(I_L(M_1 i + x, M_2 j + y) - I_R(M_1 i + x + u_x, M_2 j + y + u_y))^2$$

Figure 3:
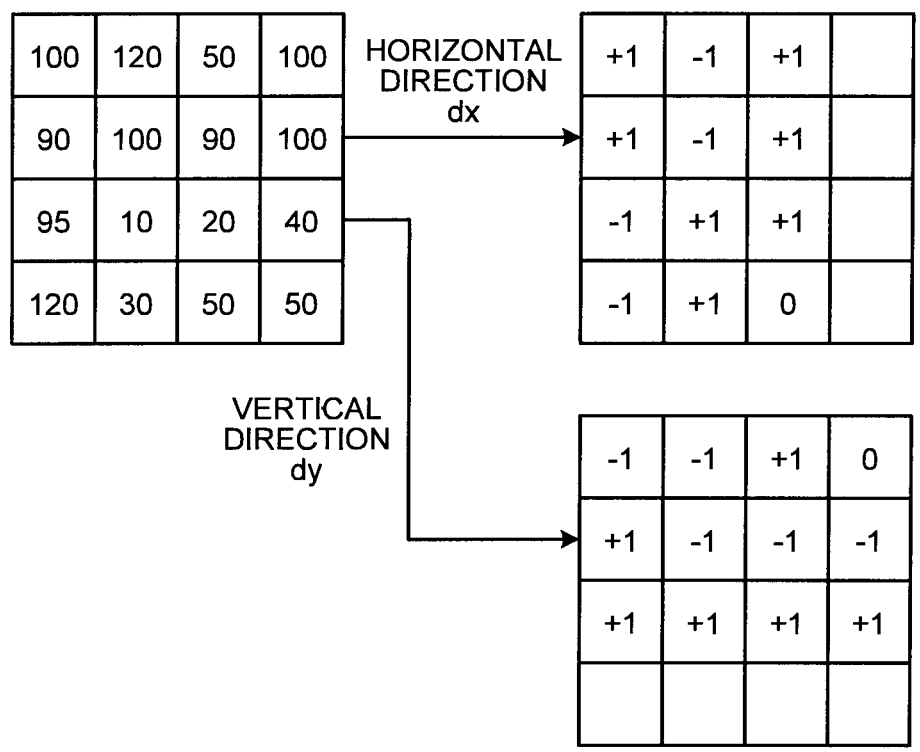
FIG. 3 is a diagram showing an example of an ISC.

The second block evaluation value calculating unit 13 calculates the second evaluation value that indicates a higher evaluation as the relative spatial relationship of the pixel values of the pixels in the target block and the relative spatial relationship of the pixel values of the pixels in the reference block are more closely correlated. As the relative spatial relationship, the magnitude relation between the pixel values of adjacent pixels may be adopted. An example of the second evaluation value that adopts such magnitude relation is the increment sign correlation (ISC) mentioned above. The ISC indicates, as illustrated in FIG. 3, whether the difference between the pixel values of adjacent pixels is positive, negative, or 0. By converting the difference between the pixel values of the adjacent pixels into one of three values that indicates a positive value, a negative value, or 0, instead of using the value of the difference itself, the second evaluation value can be calculated without being influenced by the offset of the pixel value discrepancy. In other words, by adopting such a second evaluation value, robustness against brightness discrepancy can be ensured. A specific method of calculating the ISC as the second evaluation value is explained below. The second block evaluation value calculating unit 13 calculates, in the source image, $\text{isc}_{Lx}(x, y)$ between adjacent pixels in the horizontal direction and $\text{isc}_{Ly}(x, y)$ between adjacent pixels in the vertical direction. The second block evaluation value calculating unit 13 also calculates, in the reference image, $\text{isc}_{Rx}(x, y)$ between adjacent pixels in the horizontal direction and $\text{isc}_{Ry}(x, y)$ between adjacent pixels in the vertical direction. By use of these calculated values, the second block evaluation value calculating unit 13 calculates the ISC as the second evaluation value in accordance with Expression (7).

$$ISC(i, j, u_x, u_y) = \qquad (7)$$

$$\frac{1}{M_1 M_2} \sum_{0 \leq x \leq M_1, 0 \leq y \leq M_2} \left( \begin{cases} 0 & \text{isc}_{Lx}(M_1 i + x, M_2 j + y) = \\ & \text{isc}_{Rx}(M_1 i + x + u_x, M_2 j + y + u_y) \\ 1 & \text{otherwise} \end{cases} + \begin{cases} 0 & \text{isc}_{Ly}(M_1 i + x, M_2 j + y) = \\ & \text{isc}_{Ry}(M_1 i + x + u_x, M_2 j + y + u_y \\ 1 & \text{otherwise} \end{cases} \right)$$

$$\text{isc}_{Lx}(x, y) = \begin{cases} +1 & I_L(x+1, y) > I_L(x, y) \\ -1 & I_L(x+1, y) < I_L(x, y) \\ 0 & I_L(x+1, y) = I_L(x, y) \end{cases}$$

$$\text{isc}_{Ly}(x, y) = \begin{cases} +1 & I_L(x, y+1) > I_L(x, y) \\ -1 & I_L(x, y+1) > I_L(x, y) \\ 0 & I_L(x, y+1) = I_L(x, y) \end{cases}$$

$$\text{isc}_{Rx}(x, y) = \begin{cases} +1 & I_R(x+1, y) > I_R(x, y) \\ -1 & I_R(x+1, y) < I_R(x, y) \\ 0 & I_R(x+1, y) = I_R(x, y) \end{cases}$$

-continued $$\text{isc}_{Ry}(x, y) = \begin{cases} +1 & I_R(x, y+1) > I_R(x, y) \\ -1 & I_R(x, y+1) < I_R(x, y) \\ 0 & I_R(x, y+1) = I_R(x, y) \end{cases}$$

Furthermore, the gradient of the pixel value may be adopted in the calculation of the second evaluation value. In such a situation, the second block evaluation value calculating unit 13 separately calculates the gradient $dx_L(x, y)$ of pixels that are adjacent in the horizontal direction of the source image and the gradient $dy_L(x, y)$ of pixels that are adjacent in the vertical direction, and also separately calculates the gradient $dx_R(x, y)$ of pixels that are adjacent in the horizontal direction of the reference image and the gradient $dy_R(x, y)$ of pixels that are adjacent in the vertical direction. Then, the second block evaluation value calculating unit 13 uses the calculated values to calculate a difference DXY between the gradients of the pixel values as the second evaluation value in accordance with Expression (8).

$$DXY(i, j, u_x, u_y) = \qquad (8)$$

$$\frac{1}{M_1 M_2} \sum_{0 \leq x \leq M_1, 0 \leq y \leq M_2} \left( \begin{vmatrix} dx_R(M_1 i + x + u_x, M_2 j + y + u_y) - \\ dx_L(M_1 i + x, M_2 j + y) \end{vmatrix} + \begin{vmatrix} dy_R(M_1 i + x + u_x, M_2 j + y + u_y) - \\ dy_L(M_1 i + x, M_2 j + y) \end{vmatrix} \right)$$

$$dx_L(x, y) = I_L(x-1, y) - I_L(x, y)$$
$$dy_L(x, y) = I_L(x, y+1) - I_L(x, y)$$
$$dx_R(x, y) = I_R(x+1, y) - I_R(x, y)$$
$$dy_R(x, y) = I_R(x, y+1) - I_R(x, y)$$

The evaluation value combining unit 14 combines the first evaluation value with the second evaluation value obtained by the second block evaluation value calculating unit 13 by increasing the weight of the first evaluation value calculated by the first block evaluation value calculating unit 12 as the activity value calculated by the activity value calculating unit 11 increases, and reducing the weight of the first evaluation value as the activity value decreases, and thereby obtains the third evaluation value.

The reason for which the weight of the first evaluation value that is used for the calculation of the third evaluation value is changed in accordance with the activity value follows below. The first evaluation value based on the difference of the pixel values is, as discussed above, vulnerable to varying offsets of the pixel value discrepancy and the like. This is because, for example, the MAD that serves as the first evaluation value is based on the assumption that the means of pixel values in highly correlated and associated blocks are equal to one another. However, if the offset varies due to the pixel value discrepancy or the like, the means of the pixels values differ among the blocks. On the other hand, the second evaluation value is based on the relative spatial relationship of the pixel values in a block, and thus assumption about the equal means of the pixel values of different blocks is not required. For this reason, the second evaluation value is robust against variations of the offset of the pixel value discrepancy or the like. Conversely, because the difference of the means of the pixel values among the blocks cannot be evaluated, the accuracy of the alignment is lower than with the first evaluation value. Even with the variations of offset, however, block matching can still be successfully conducted with this value, if the variation range is significantly smaller than for the MAD that serves as the first evaluation value.

Figure 4:
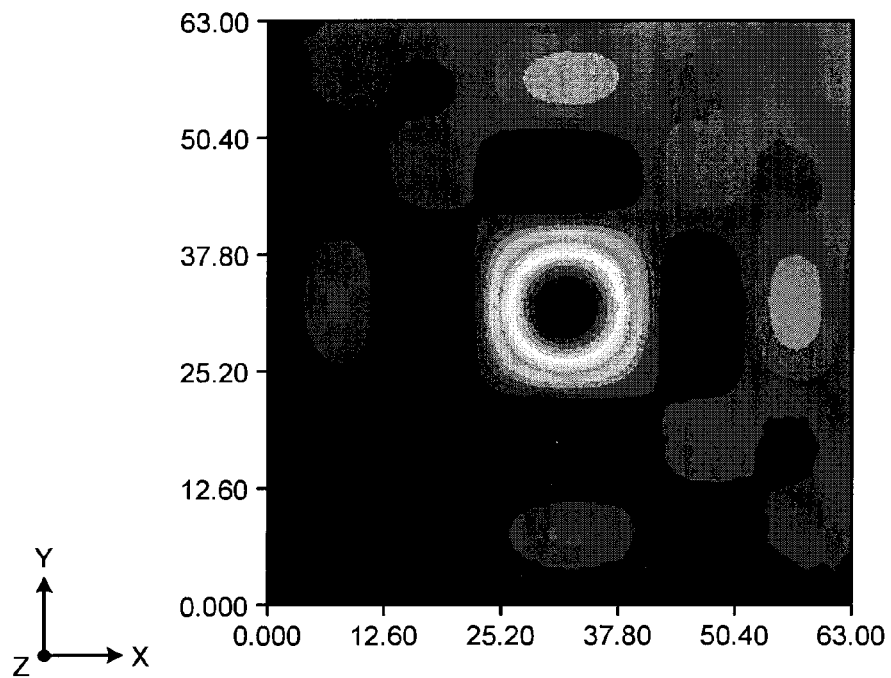
FIG. 4 is a diagram showing an example of a model source image.
Figure 5:
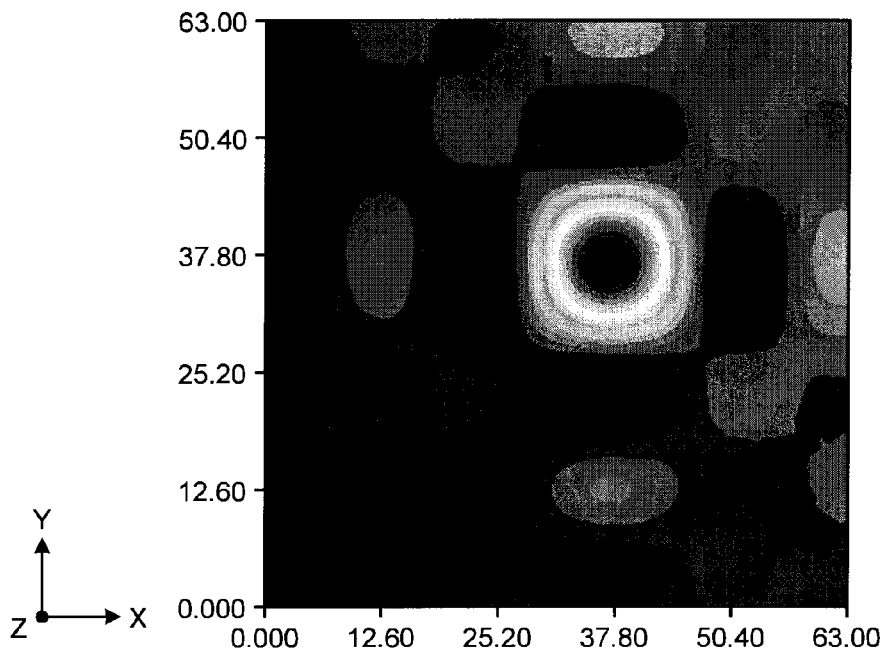
FIG. 5 is a diagram showing an example of a model reference image.

To explain in more detail, specific models of the source image and the reference image are given as examples. FIG. 4 is a diagram showing an example model of the source image. FIG. 5 is a diagram showing an example model of the reference image. The pixel value of a pixel at a position (x, y) in the source image is represented as $I_L(x, y)$ as expressed in Expression (9), and the pixel value of a pixel at the position (x, y) in the reference image is represented as $I_R(x, y)$, as expressed in Expression (10).

$$I_L(x, y) = \alpha \frac{\sin(0.1\pi x)}{0.1\pi x} \frac{\sin(0.1\pi y)}{0.1\pi y} + 0.1(x + y) \tag{9}$$

$$I_R(x, y) = \alpha \frac{\sin(0.1\pi(x-d))}{0.1\pi(x-d)} \frac{\sin(0.1\pi(y-d))}{0.1\pi(y-d)} + 0.1((x-d) + (y-d)) + \beta \tag{10}$$

Figure 6:
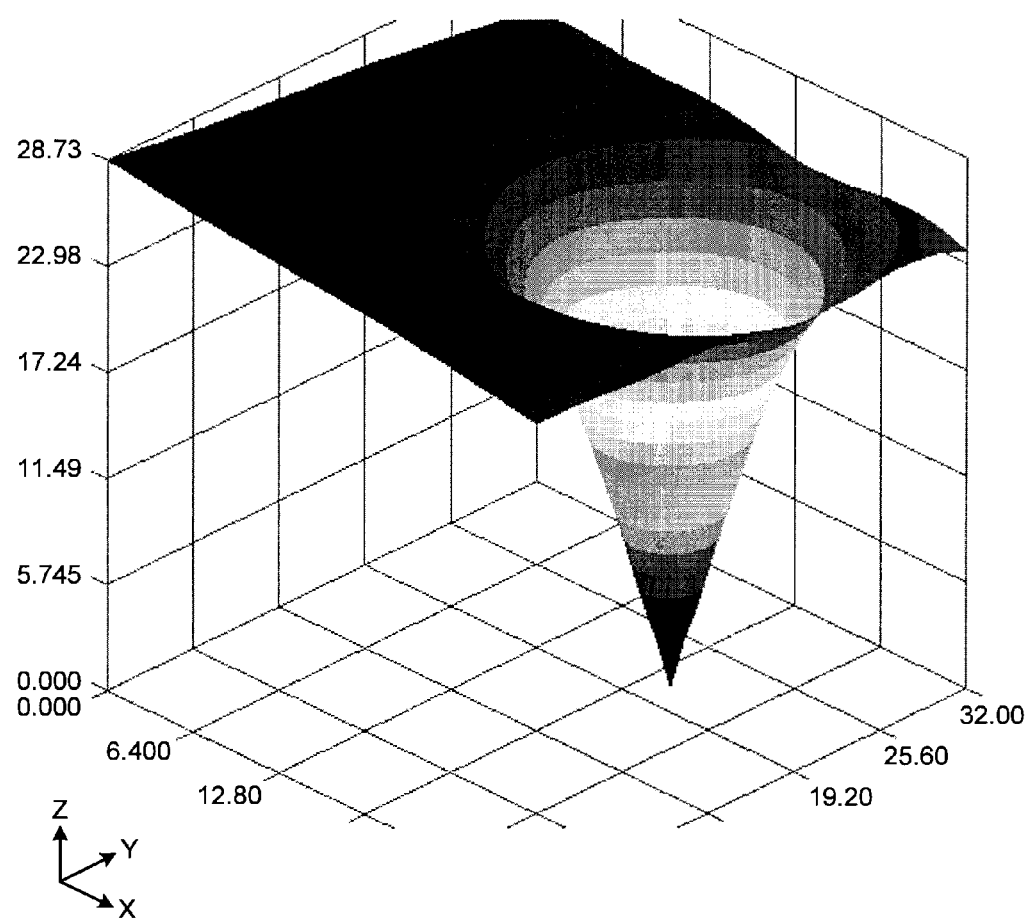
FIG. 6 is a distribution chart of MAD evaluation values.
Figure 7:
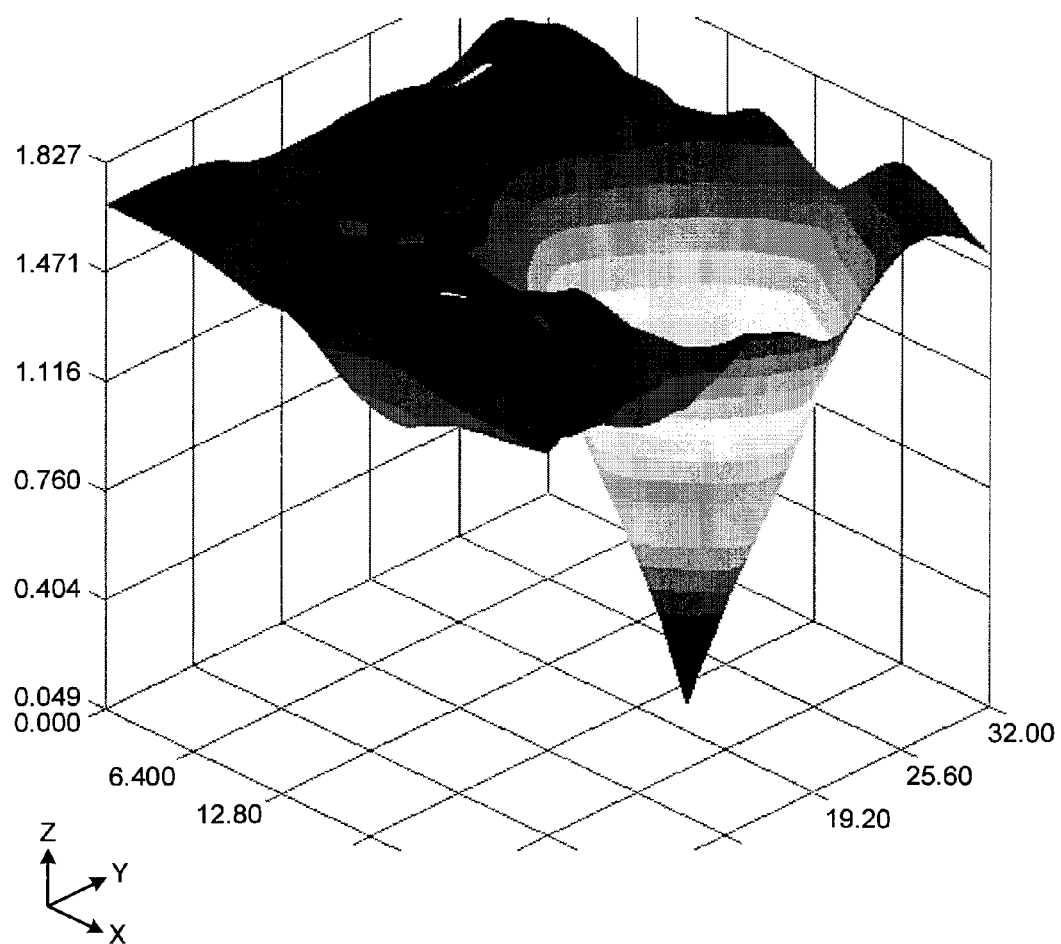
FIG. 7 is a distribution chart of ISC evaluation values.

Here, (d=5, d=5) indicates the positional discrepancy between the source image and the reference image, $\alpha=200$ indicates the scale of shape distribution, and $\beta=0$ indicates the pixel value discrepancy between the source image and the reference image. FIG. 6 is a diagram showing the distribution of the MAD evaluation values. In this diagram, the highest evaluation value at a position shifted (5, 5) from the center is presented. FIG. 7 is a diagram showing the distribution of the ISC evaluation values. In this diagram, the highest evaluation value at the position shifted approximately (5, 5) from the center is presented, but the curve is broadly spread out, which means that the alignment is not conducted as accurately as with the MAD.

Figure 8:
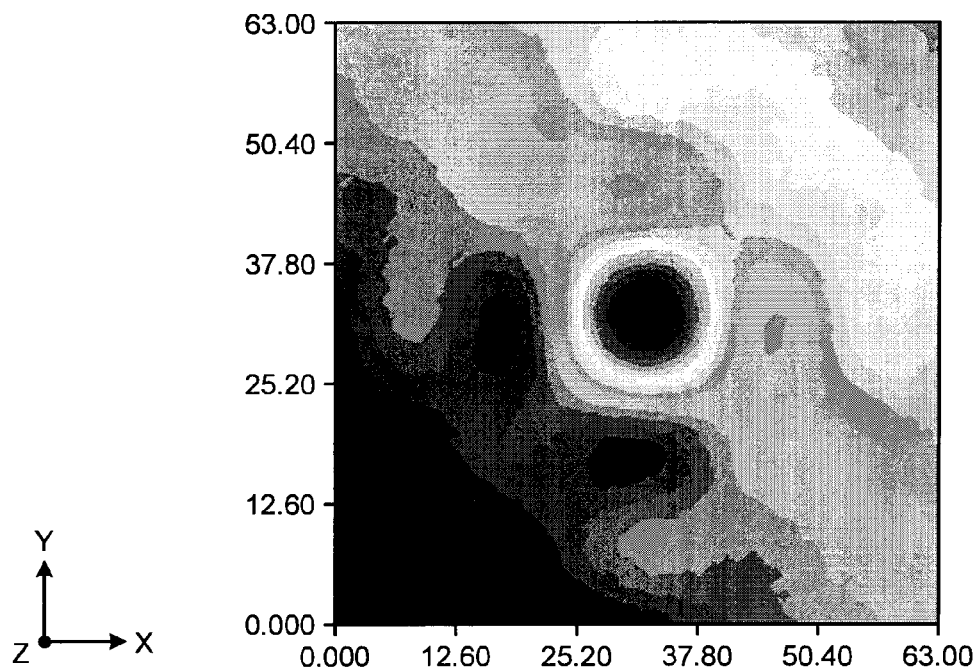
FIG. 8 is a diagram showing an example source image.
Figure 9:
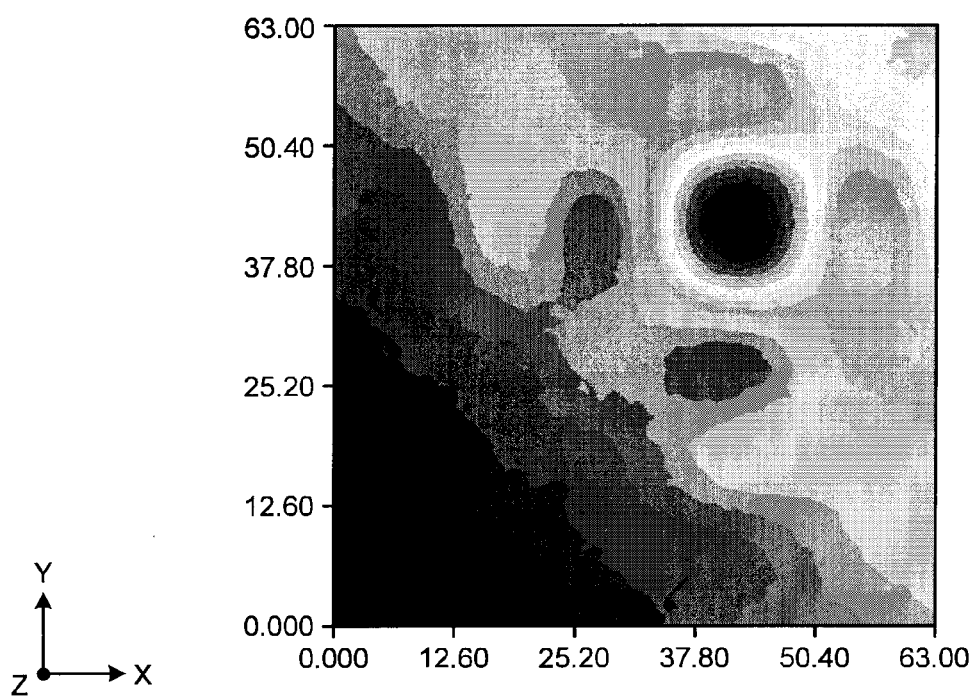
FIG. 9 is a diagram showing an example reference image.
Figure 10:
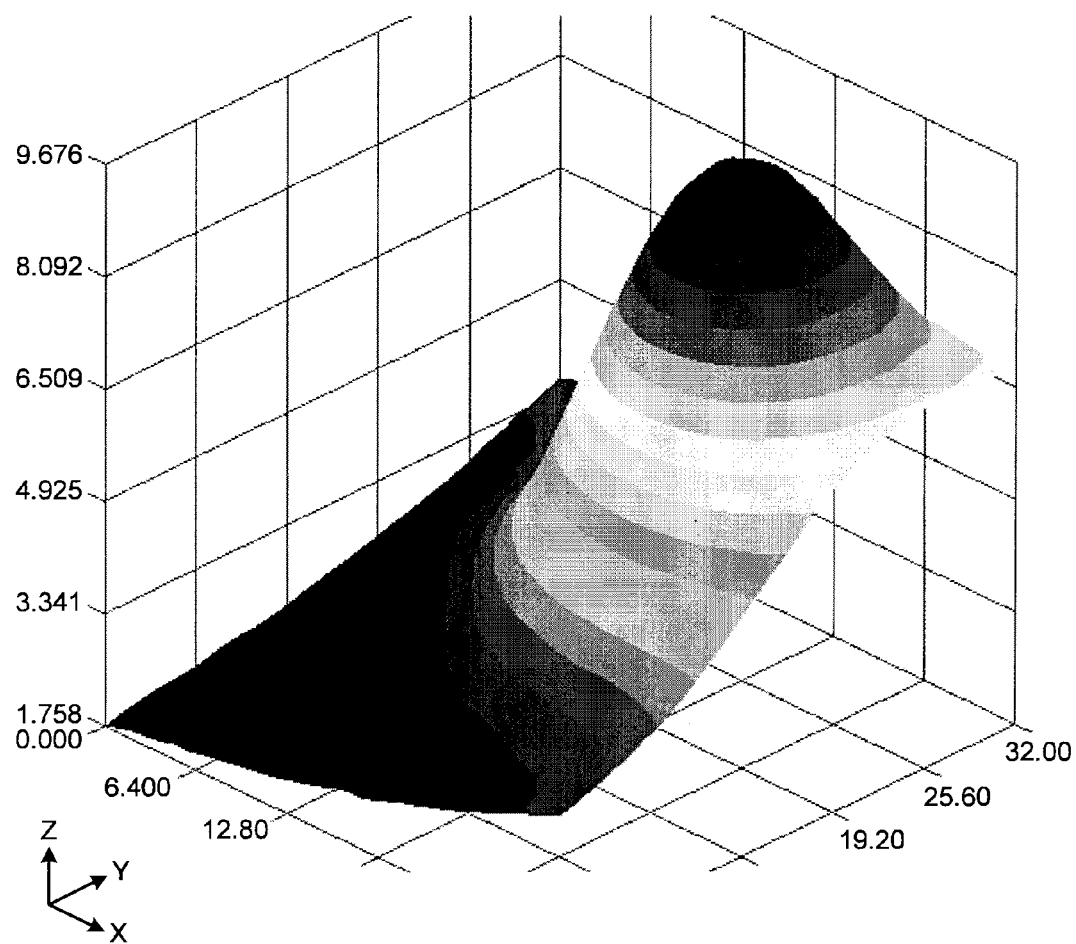
FIG. 10 is a distribution chart of MAD evaluation values.
Figure 11:
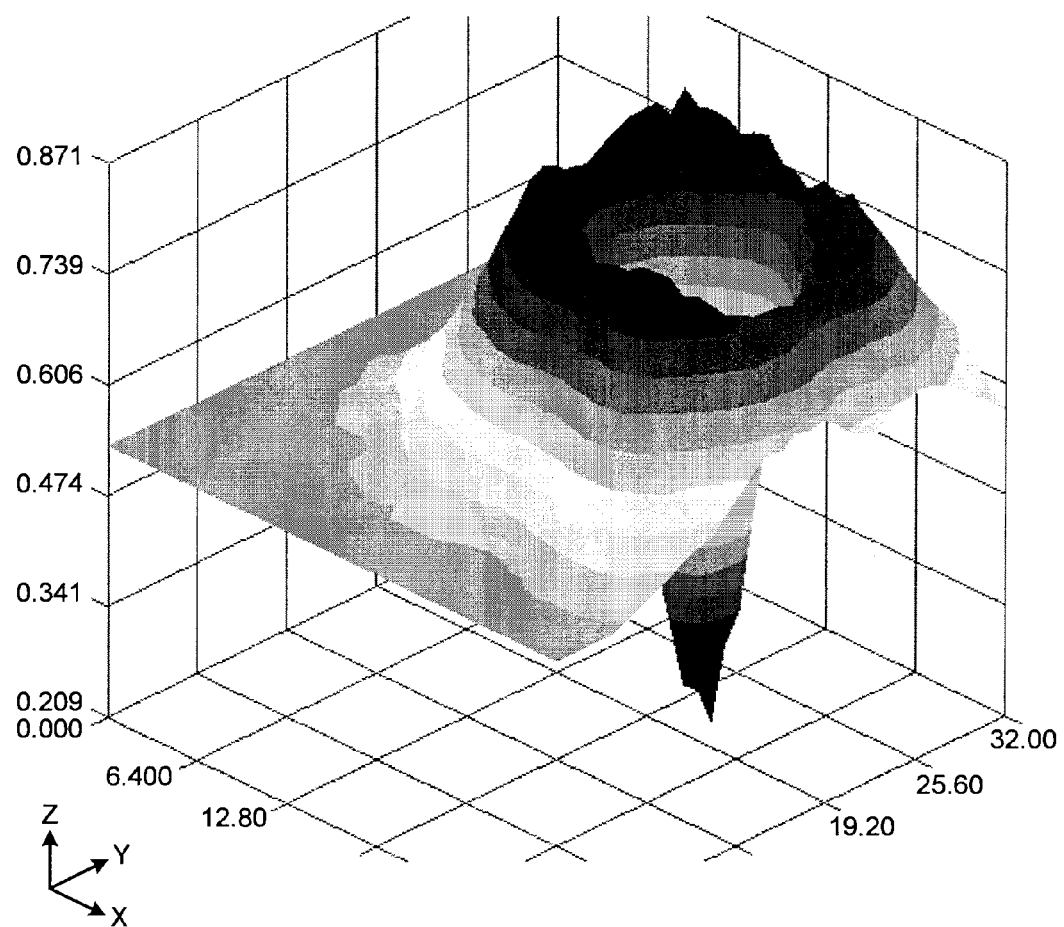
FIG. 11 is a distribution chart of ISC evaluation values.

Next, specific models of the source image and the reference image are explained, where the scale of shape distribution is $\alpha=10$ (i.e., the variation of the shape is small) and the pixel value discrepancy between the source image and the reference image is $\beta=10$. FIG. 8 is a diagram of the source image. FIG. 9 is a diagram of the reference image. FIG. 10 is a diagram of the distribution of the MAD evaluation values. It can be understood from this diagram that the positional discrepancy is not correctly detected in accordance with the evaluation value indicating the highest evaluation. FIG. 11 is a diagram of the distribution of the ISC evaluation values. With the ISC, even with the pixel value discrepancy, the positional discrepancy can be robustly detected, as can be seen from this diagram. In other words, the alignment can be more accurately conducted with the ISC than with the MAD.

Figure 12:
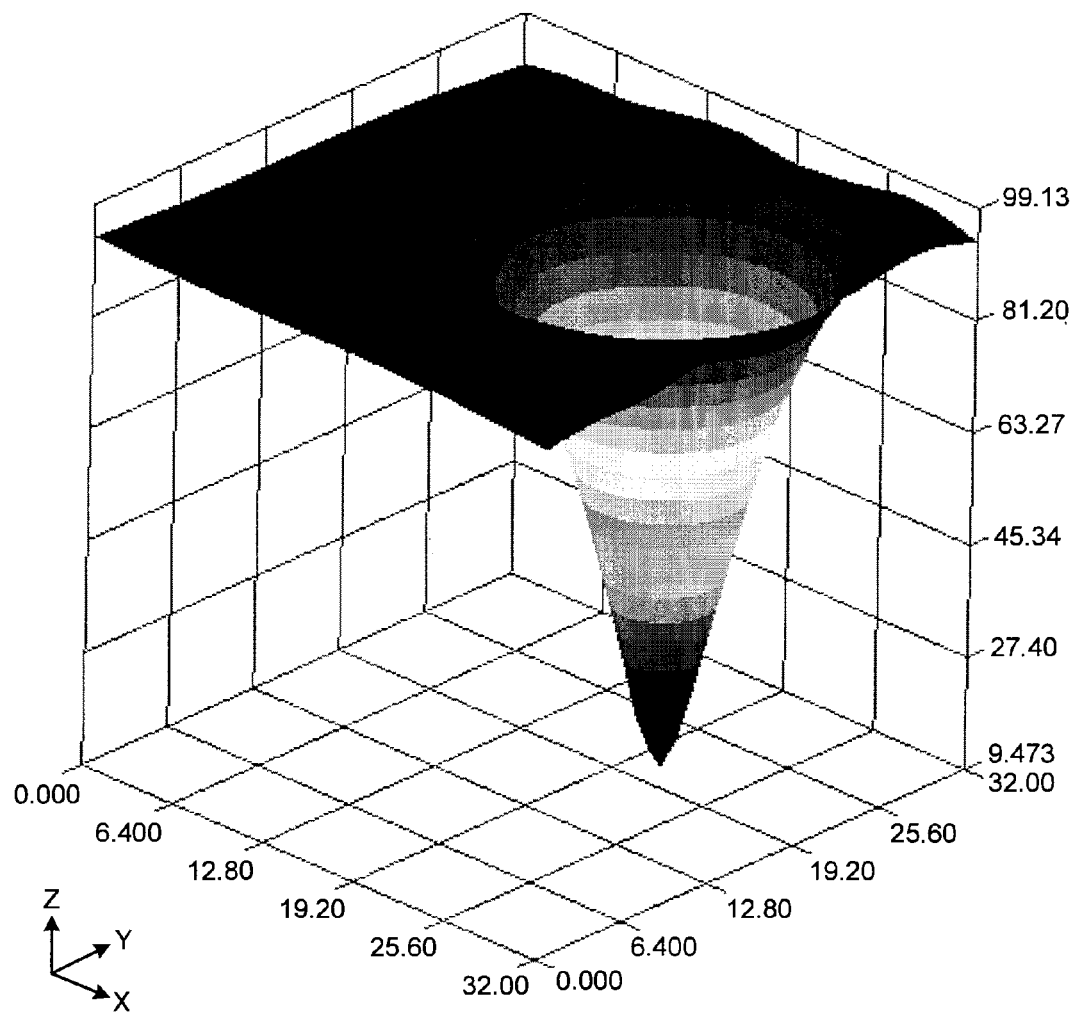
FIG. 12 is a distribution chart of MAD evaluation values.
Figure 13:
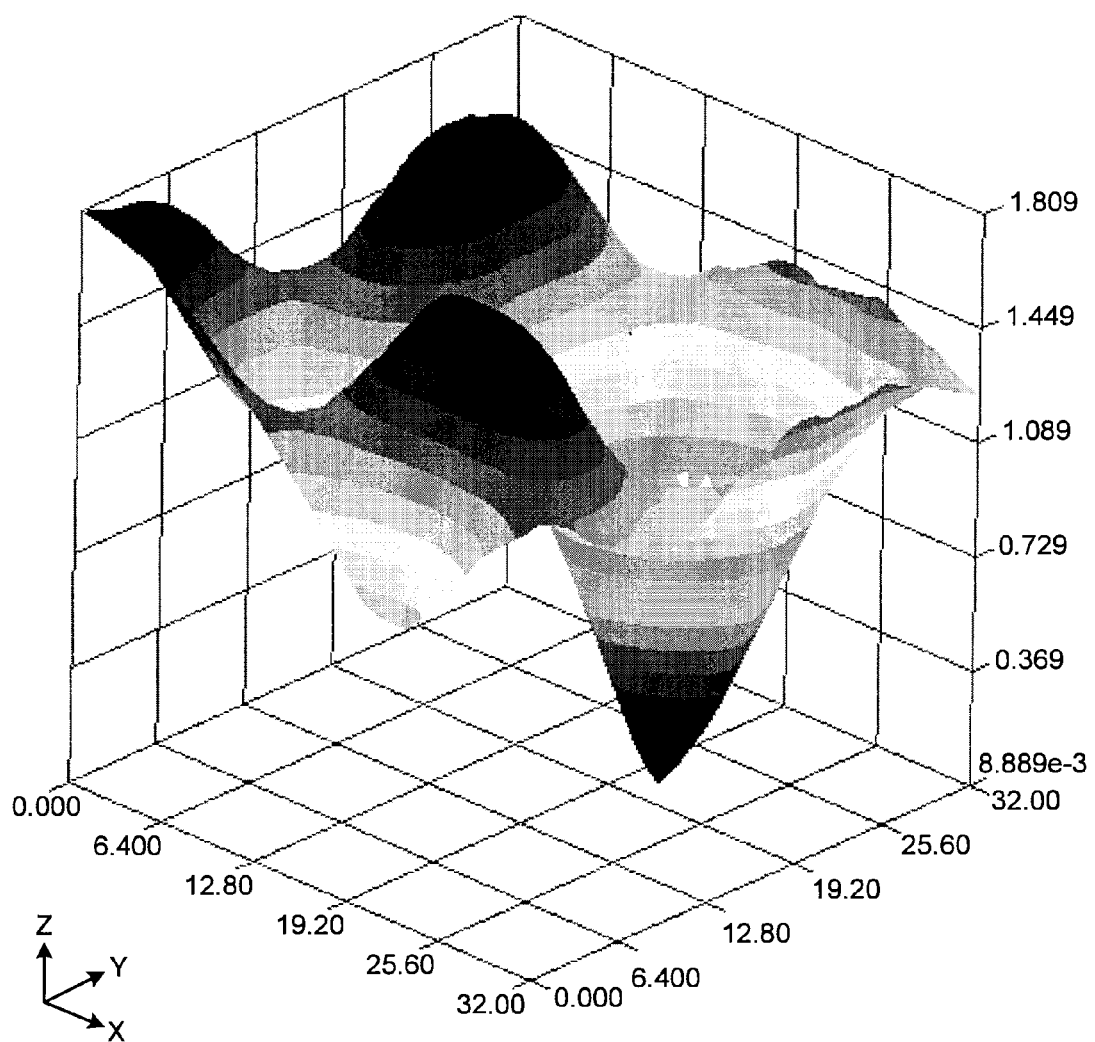
FIG. 13 is a distribution chart of ISC evaluation values.

Next, specific models of the source image and the reference image are explained, where the scale of the shape distribution is $\alpha=200$ (i.e., the variation of the shape is large) and the pixel value discrepancy between the source image and the reference image is $\beta=10$. FIG. 12 is a diagram showing the distribution of the MAD evaluation values. As illustrated in this diagram, if the variation of the shape is large enough with respect to the pixel value discrepancy, the positional discrepancy can be accurately detected by use of the MAD evaluation values. FIG. 13 is a diagram showing the distribution of the ISC evaluation values.

In other words, if $\alpha/\beta$ is large enough, accurate evaluation can be obtained with the MAD. In general, $\alpha$ and $\beta$ are both unknown; however, the activity value ACT can be substituted for $\alpha$.

In the above example,
when $\alpha=10$, ACT=2.3
when $\alpha=100$, ACT=21.3
when $\alpha=200$, ACT=42.6

This shows a correlation between $\alpha$ and the activity value ACT. Although $\beta$ is completely unknown, a certain value may be hypothesized and set. A parameter for converting $\alpha$ to an activity value should be set with reference to the ACT that satisfies ACT/$\beta$>T (T is any arbitrary number). It is understood from the above that, if the value of ACT/$\beta$ is small, accurate evaluation may not be obtained with the first evaluation value such as the MAD, but if the value of ACT/$\beta$ is large enough, accurate evaluation can be obtained with the first evaluation value. This means that, when $\beta$ is fixed to a proper value, the reliability of the evaluation indicated by the first evaluation value changes in accordance with the value of the ACT. Hence, according to the present embodiment, the weight of the first evaluation value incorporated into the calculation of the third evaluation value for the later-described maximum evaluation search is varied in accordance with the activity value.

Figure 14:
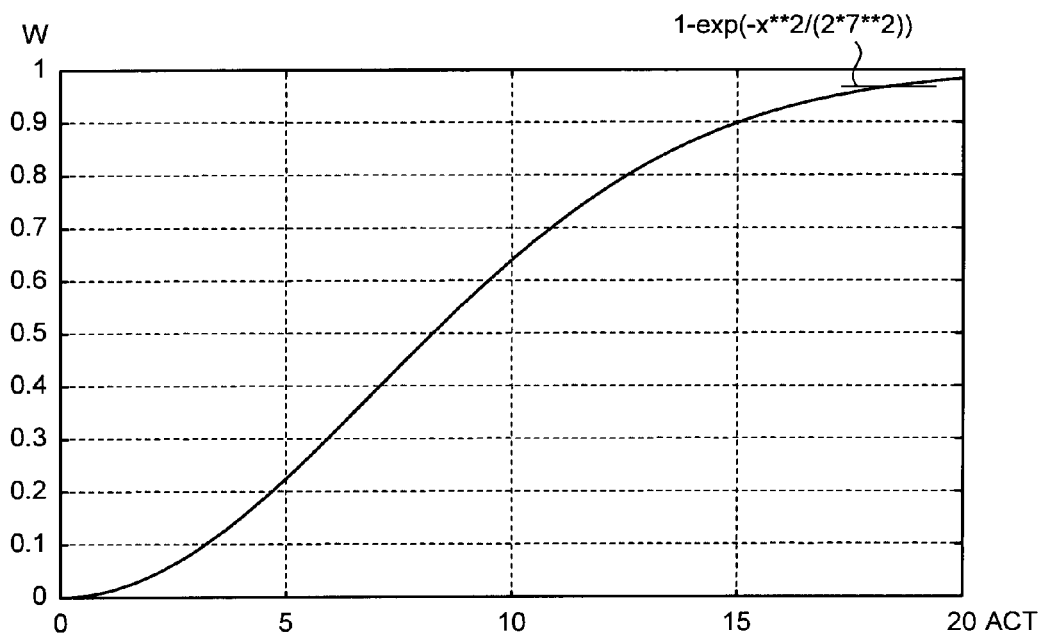
FIG. 14 is a diagram of a Gauss function for obtaining a reliability w.

The reliability calculated by normalizing the activity value ACT is used as the weight of the first evaluation value that is incorporated in the calculation of the third evaluation value. In the calculation of this reliability, for example, an increasing function for obtaining the reliability w is adopted by using the activity value ACT as a variable. The Gauss function may be adopted as an increasing function. More specifically, the reliability w is calculated from Expression (11) shown below. The standard deviation $\delta$ in the Gauss function should be set to ACT/$\beta$ at which the first evaluation value is reliable. For example, $\delta$=ACT/$\beta$>T may be established. FIG. 14 is a diagram of a Gauss function for obtaining the reliability w by using the activity value ACT as a variable.

$$w(i, j) = 1 - \exp\left(-\frac{ACT(i, j)^2}{2\sigma^2}\right) \tag{11}$$

Figure 15:
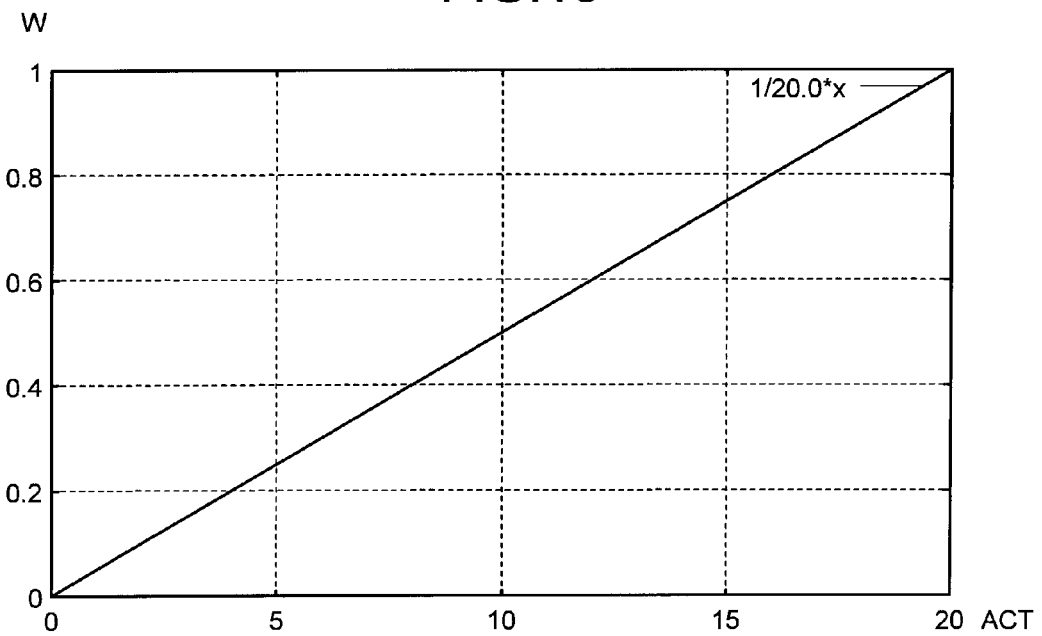
FIG. 15 is a diagram of a linear function for obtaining the reliability w.

Furthermore, a linear function may be used in the calculation of the reliability. In such calculation, the reliability is obtained in accordance with Expression (12). Here, a and b represent the gradient and intercept of a line. FIG. 15 is a diagram of a linear function for obtaining the reliability w by using the activity value ACT as a variable.

$$w(i,j) = \max(\min(a \cdot ACT(i,j) + b, 1), 0) \tag{12}$$

Figure 16:
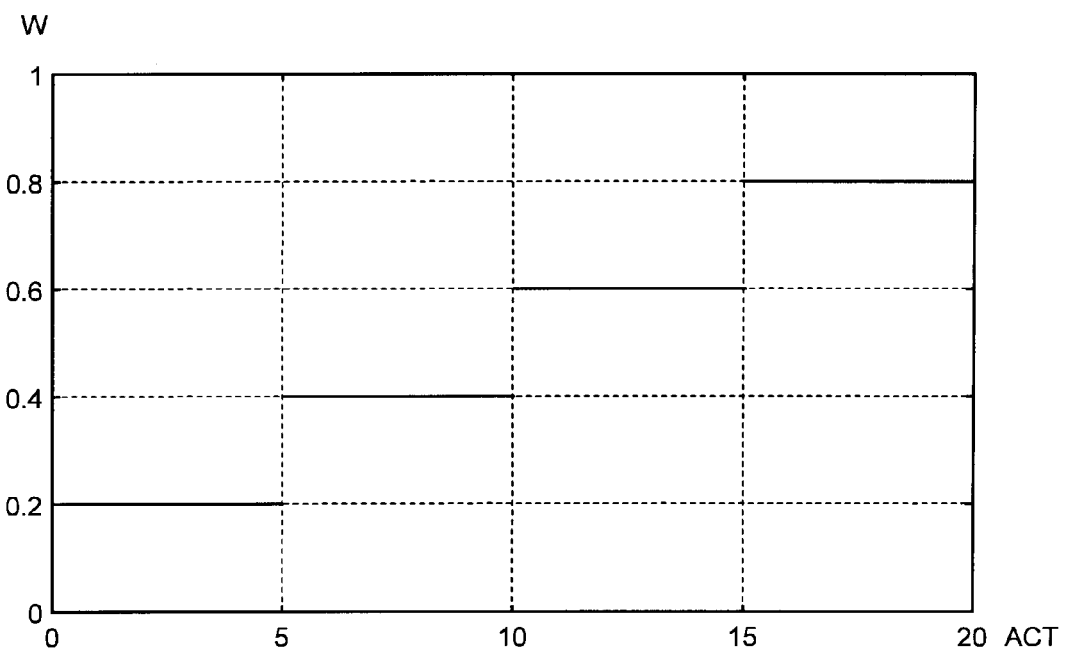
FIG. 16 is a diagram of an increasing function for obtaining the reliability w.

Still further, an increasing function as indicated in FIG. 16 may be adopted in the calculation of the reliability.

The evaluation value combining unit 14 calculates the third evaluation value E by using the first evaluation value multiplied by the reliability and the second evaluation value, in accordance with Expression (13). Here, $\lambda \geq 0$ represents a relative weight of the first evaluation value and the second evaluation value.

$$E(i,j,u_x,u_y) = w(i,j)\text{MAD}(i,j,u_x,u_y) + \lambda \text{ISC}(i,j,u_x,u_y) \tag{13}$$

The maximum evaluation searching unit 15 conducts a maximum evaluation search by use of the third evaluation value calculated by the evaluation value combining unit 14. For example, in the reference image, when a reference block that is highly correlated to the target block is searched from a rectangular area between −W and W, the maximum evaluation search problem (block matching algorithm) for obtaining a vector u(i, j) corresponding to the index (i, j) that indicates the position of the reference block is indicated by Expression (14). The error becomes smaller when both the first evaluation value and the second evaluation value indicate high evaluation, and in the maximum evaluation search, the error is minimized. Hence, Expression (14) represents a minimization problem. Expression Symbol 1 indicates that $u_x$ and $u_y$ that minimize an error function E are to be found.

$$u(i, j) = \underset{-W \leq u_x \leq W, -W \leq u_y \leq W}{\operatorname{argmin}} E(i, j, u_x, u_y) \quad (14)$$

$$\underset{-W \leq u_x \leq W, -W \leq u_y \leq W}{\operatorname{argmin}} E \quad \text{Expression Symbol 1}$$

In short, the maximum evaluation searching unit 15 conducts the maximum evaluation search on all the patterns in combination of i, j, x, and y. Furthermore, it is assumed that the vector in the block is the same as a motion vector of the block. Thus, Expression (15) is established.

$$u(x,y) := u(i,j) \quad (15)$$

Figure 17:
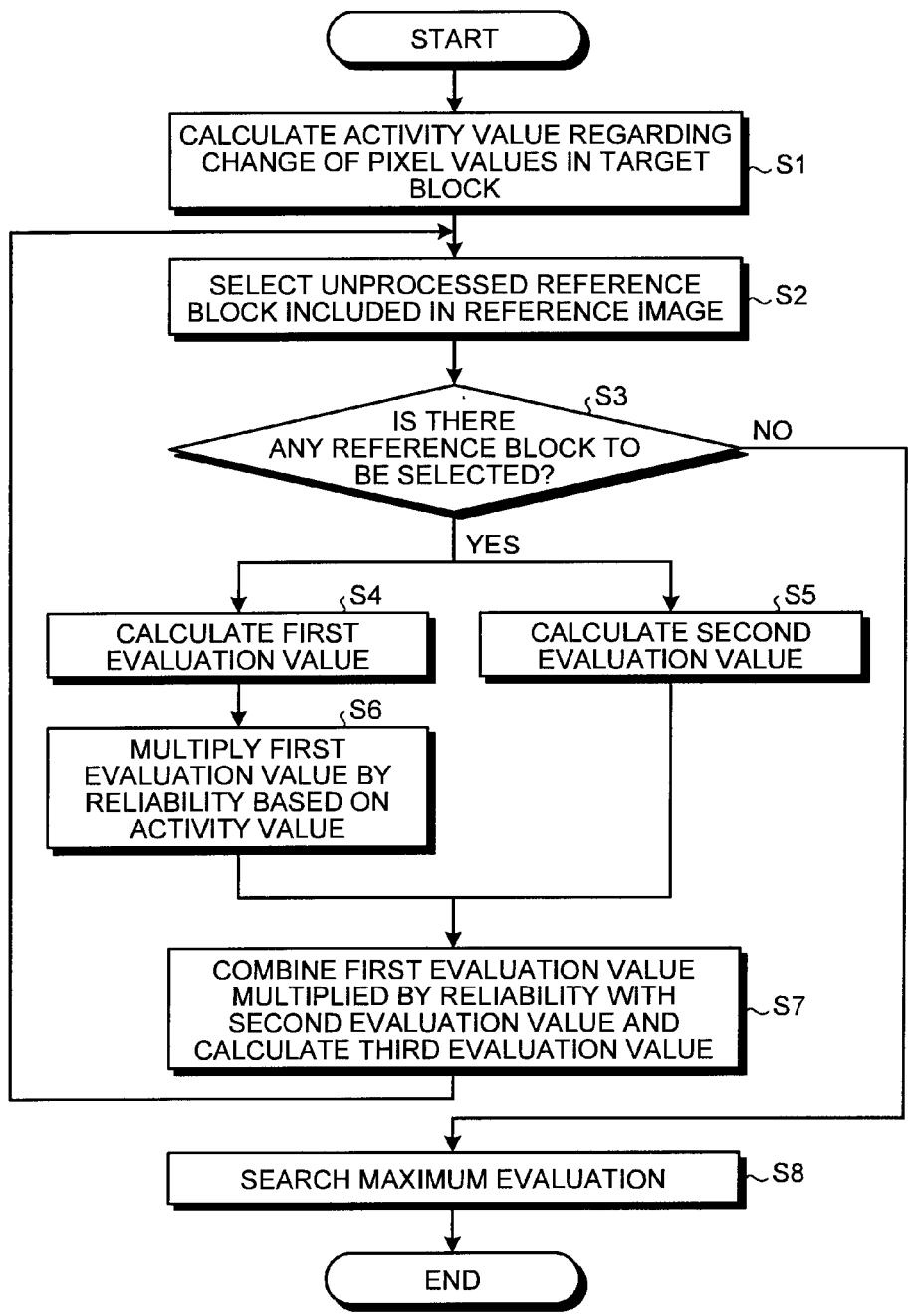
FIG. 17 is a flowchart showing a procedure of a corresponding block searching process.

Next, the procedure of a corresponding block search process performed by the image processing device according to the present embodiment is explained with reference to FIG. 17. The image processing device calculates the activity value for the target block by the function of the activity value calculating unit 11 (step S1). Then, the image processing device selects a reference block that is used for block matching with the target block from the reference image (step S2). The reference block to be selected may be an unused one of the reference blocks predetermined as choices for block matching, or one obtained by shifting the reference block selected at step S2 in the previous cycle, one pixel or more in at least either one of the horizontal and vertical directions in the reference image. Here, when no reference block is selected (no at step S3), the image processing device proceeds to step S8, and when a reference block is selected (yes at step S3), the device proceeds to steps S4 and S5.

At step S4, the image processing device uses the target block and the reference block selected at step S2 to calculate the first evaluation value by the function of the first block evaluation value calculating unit 12. At step S5, the image processing device uses the target block and the reference block selected at step S2 to calculate the second evaluation value, by the function of the second block evaluation value calculating unit 13. Then, by the function of the evaluation value combining unit 14, the image processing device multiplies the first evaluation value calculated at step S4 by the reliability based on the activity value calculated at step S1 (step S6), and calculates the third evaluation value by use of the first evaluation value multiplied by the reliability and the second evaluation value calculated at step S5 (step S7). The image processing device stores this third evaluation value in the main storage unit such as an RAM. Thereafter, the image processing device returns to step S2, and repeats the process of steps S4 through S7 until there are no more reference blocks to be selected for matching with the target block. Then, when there are no more reference blocks to be selected (no at step S3), the image processing device conducts the maximum evaluation value search at step S8 by the function of the maximum evaluation searching unit 15, by use of the third evaluation values calculated individually for the multiple reference blocks at step S7 and stored in the main storage unit.

Figure 18:
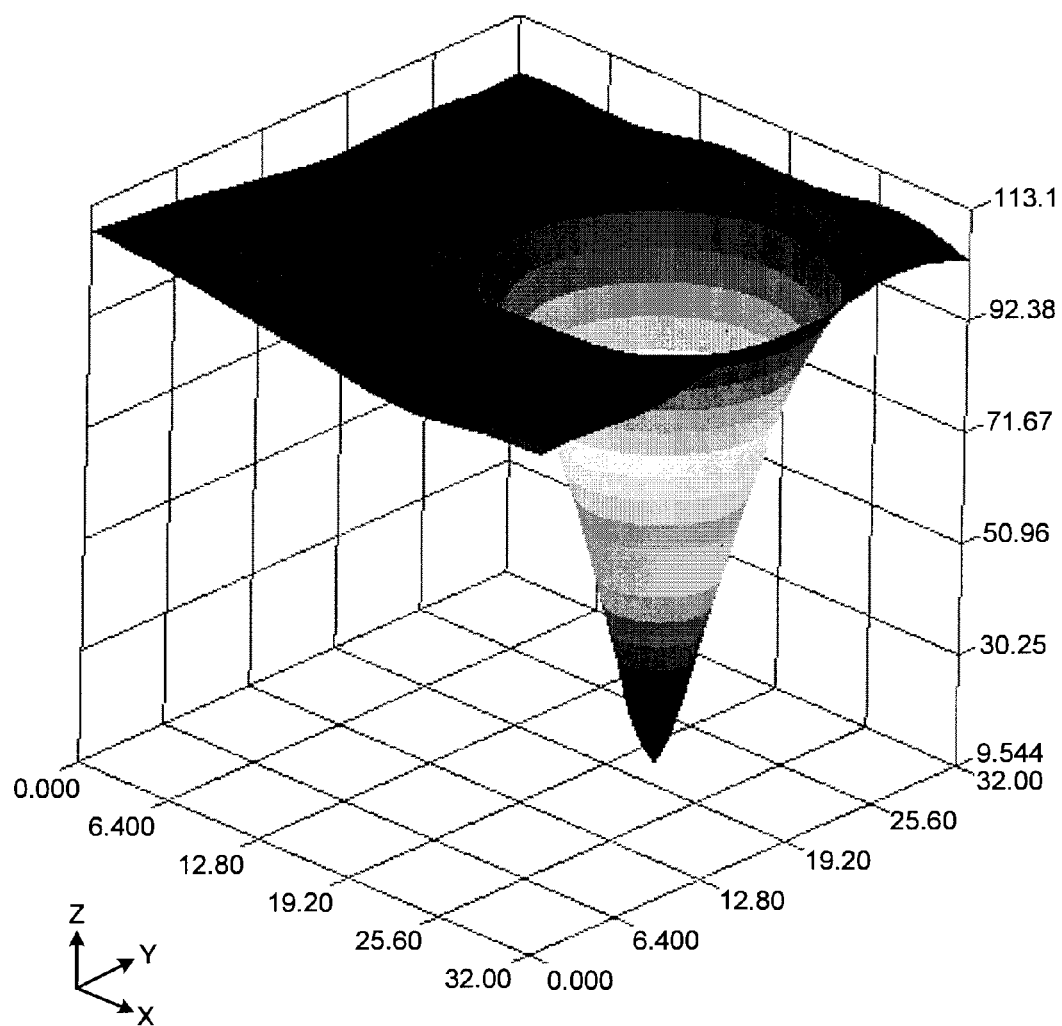
FIG. 18 is a distribution chart of third evaluation values.

The distribution of the third evaluation values is now explained. FIG. 18 is a diagram showing the distribution of the third evaluation values calculated when the scale of the shape distribution is α=200, and the pixel value discrepancy between the source image and the reference image is β=10.

Figure 19:
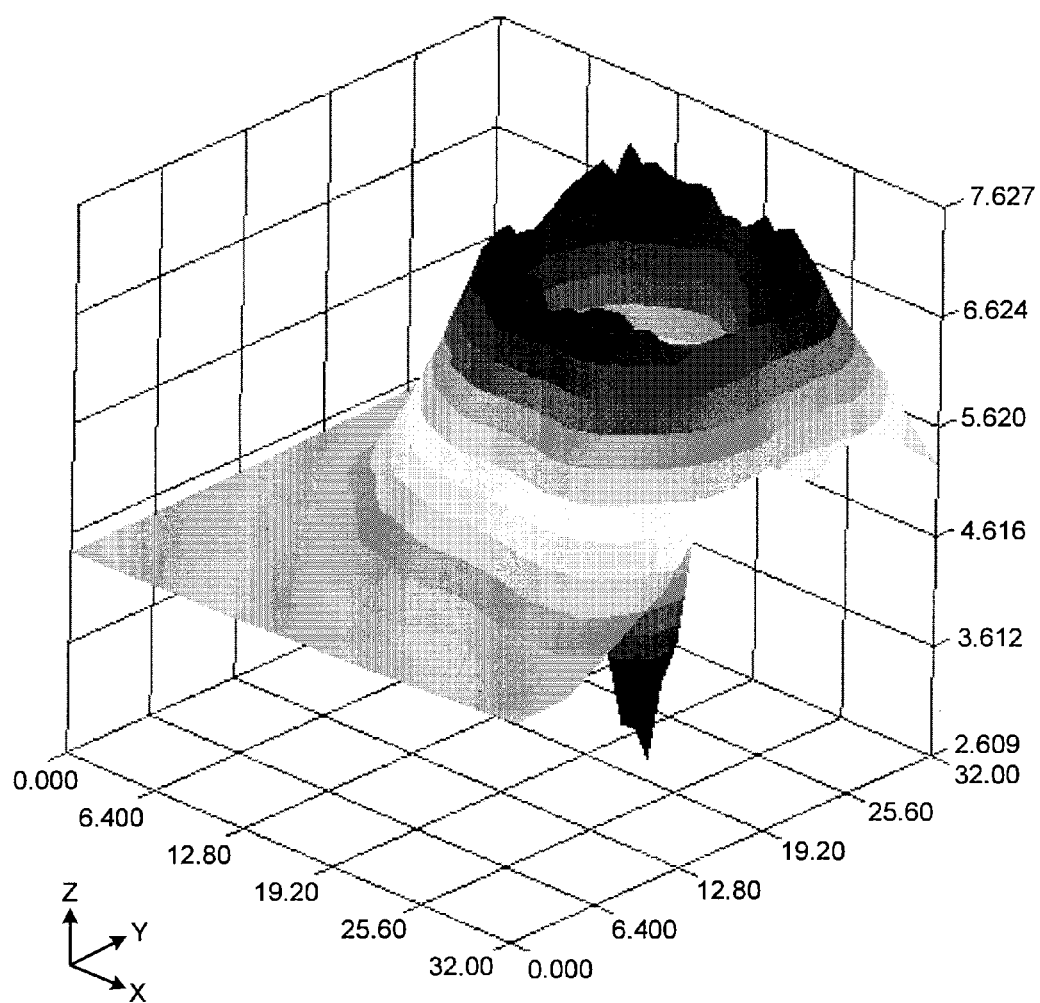
FIG. 19 is a distribution chart of the third evaluation values.

FIG. 19 is a diagram showing the distribution of the third evaluation values calculated when the scale of the shape distribution is α=10, and the pixel value discrepancy between the source image and the reference image is β=10. In the examples of these diagrams, regardless of whether α is large or small, the positional discrepancy is correctly detected, and the alignment is performed with high accuracy.

As a result of the maximum evaluation search using the third evaluation value, a reference block corresponding to the indices i and j of u(i, j) that is obtained as a solution of Expression (14) is searched for as a block highly correlated to the target block and associated with the target block.

As described above, according to the present embodiment, robustness with respect to both the accuracy of alignment and the brightness discrepancy can be ensured, and thereby block matching can be realized with higher accuracy.

In the above embodiment, various programs implemented by the image processing device may be stored in a computer connected to a network such as the Internet, and may be provided by downloading it by way of the network. Furthermore, the programs may be stored in a computer-readable recording medium, such as a CD-ROM, a flexible disk (FD), a CD-R, a digital versatile disk (DVD) as files in an installable or executable format, and provided as computer program products.

In the above embodiments, the shapes of the target block and the reference block are not limited to rectangles discussed above, as long as their shapes and sizes are analogous.

In the above embodiments, the relative spatial relationship of the pixel values of pixels in each block, the correlation evaluation of which is indicated by the second evaluation value, may be at least either one of the relative relationship of the pixel values of pixels aligned in a horizontal direction and the relative relationship of the pixel values of pixels aligned in a vertical direction.

In the above embodiments, the first evaluation value and the second evaluation value are not limited to the above examples. In addition, the calculation of the third evaluation value is not limited to the above example. The maximum evaluation searching method is also not limited to the above example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method comprising:
   calculating an activity value for a first block that is an image region that includes part of pixels of a first image, the activity value indicating a higher degree of activity as pixel values vary in a greater degree among the pixels in the first block;
   calculating a first evaluation value that is higher as a difference between a pixel value of the first block and a pixel value of a second block is smaller, the second block being an image region including part of pixels of a second image;
   calculating a second evaluation value that is higher as correlation between a relative spatial relationship of the pixel value of the first block and a relative spatial relationship of the pixel value of the second block is higher; and calculating a third evaluation value by weighting the first evaluation value and the second evaluation value to search for the second block that corresponds to the first block, a weight of the first evaluation value being larger as the activity value is larger.

2. The image processing method according to claim 1, wherein, in calculating the activity value, the activity value that indicates the higher degree for a greater standard deviation of the pixel values of the first block is calculated.

3. The image processing method according to claim 1, wherein, in calculating the activity value, the activity value that indicates the higher degree for a greater mean absolute difference of the pixel values of adjacent pixels in the first block is calculated.

4. The image processing method according to claim 1, wherein, in calculating the third evaluation value, the third evaluation value is calculated by changing the weight in accordance with an increase function incorporating the activity value as a variable.

5. The image processing method according to claim 1, wherein, in calculating the second evaluation value, the second evaluation value that indicates higher evaluation for a higher correlation between a relative relationship of the pixel values of adjacent pixels in the first block and a relative relationship of the pixel values of adjacent pixels in the second block is calculated.

6. The image processing method according to claim 1, wherein, in calculating the second evaluation value, the second evaluation value that indicates higher evaluation for a higher correlation between a relative relationship of the pixel values of two pixels or more aligned in a horizontal direction in the first block and a relative relationship of the pixel values of two pixels or more aligned in the horizontal direction in the second block is calculated.

7. The image processing method according to claim 1, wherein, in calculating the second evaluation value, the second evaluation value that indicates higher evaluation for a higher correlation between a relative relationship of the pixel values of two pixels or more aligned in a vertical direction in the first block and a relative relationship of the pixel values of two pixels or more aligned in the vertical direction in the second block is calculated.

8. The image processing method according to claim 1, wherein, in calculating the first evaluation value, the first evaluation value that is at least any one of a mean absolute difference, a sum of absolute differences, a mean squared error, and a sum of squared differences is calculated by use of the pixel value of the first block and the pixel value of the second block.

9. The image processing method according to claim 1, wherein, in calculating the second evaluation value, the second evaluation value that is at least either one of an increment sign correlation and a difference between gradients of the pixel values is calculated by use of the pixel value of the first block and the pixel value of the second block.

10. The image processing method according to claim 1, further comprising searching for the second block, in which the third evaluation value is maximized, as a block that corresponds to the first block.

11. An image processing apparatus comprising:
a first calculating unit that calculates an activity value for a first block that is an image region that includes part of pixels of a first image, the activity value indicating a higher degree of activity as pixel values vary in a greater degree among the pixels in the first block;
a second calculating unit that calculates a first evaluation value that is higher as a difference between the pixel values of the first block and pixel values of a second block is smaller, the second block being an image region including part of pixels of a second image;
a third calculating unit that calculates a second evaluation value that is higher as correlation between a relative spatial relationship of the pixel values of the first block and a relative spatial relationship of the pixel values of the second block is higher; and
a fourth calculating unit that calculates a third evaluation value by weighting the first evaluation value and the second evaluation value to search for the second block that corresponds to the first block, a weight of the first evaluation value being larger as the activity value is larger.

12. A computer program product having a non-transitory computer readable medium including programmed instructions, wherein the instructions, when executed by a computer, causes the computer to execute:
calculating an activity value for a first block that is an image region that includes part of pixels of a first image, the activity value indicating a higher degree of activity as pixel values vary in a greater degree among the pixels in the first block;
calculating a first evaluation value that is higher as a difference between a pixel value of the first block and a pixel value of a second block is smaller, the second block being an image region including part of pixels of a second image;
calculating a second evaluation value that is higher as correlation between a relative spatial relationship of the pixel value of the first block and a relative spatial relationship of the pixel value of the second block is higher; and
calculating a third evaluation value by weighting the first evaluation value and the second evaluation value to search for the second block that corresponds to the first block, a weight of the first evaluation value being larger as the activity value is larger.

* * * * *